UNITED STATES PATENT OFFICE.

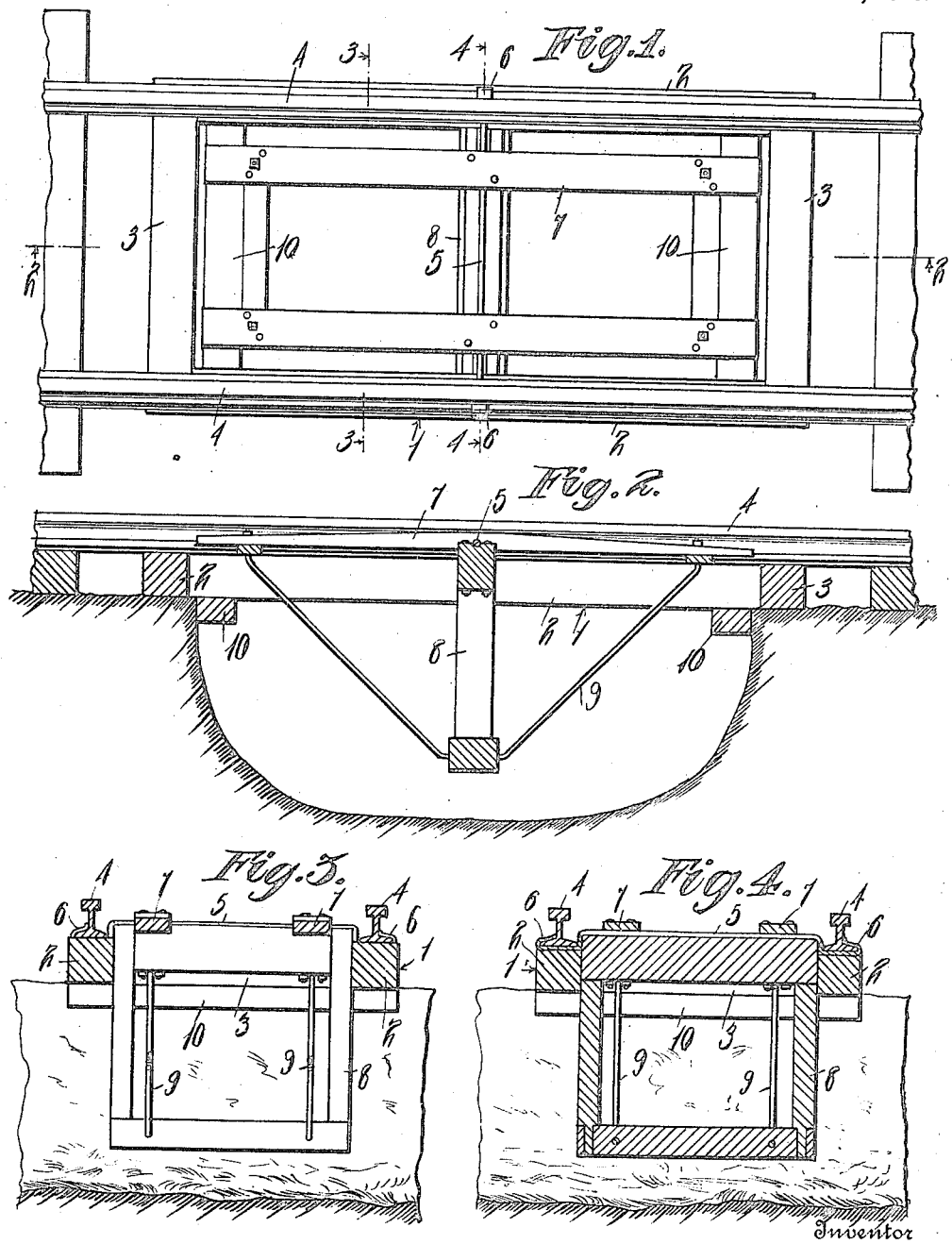

HARLEN C. BATES, OF GRANITEVILLE, MISSOURI.

CATTLE-GUARD.

1,253,459.

Specification of Letters Patent. Patented Jan. 15, 1918.

Application filed June 21, 1913. Serial No. 775,097.

*To all whom it may concern:*

Be it known that I, HARLEN C. BATES, a citizen of the United States, residing at Graniteville, in the county of Iron, State of Missouri, have invented certain new and useful Improvements in Cattle-Guards; and I do hereby declare the following to be a full, clear, and exact description of the invention, such as will enable others skilled in the art to which it appertains to make and use the same.

The present invention is directed to improvements in cattle guards, and has for its object to provide a device of this character constructed in a simple manner so as to prevent the cattle or other stock from passing upon a railroad from one field to another.

A further object of the invention is to provide a cattle guard so constructed that should an animal attempt to pass over the same it will be frightened as soon as it steps upon the device, thereby giving up the attempt.

With these and other objects in view, this invention resides in the novel features of construction, formation, combination and arrangement of parts to be hereinafter more fully described, claimed and illustrated in the accompanying drawing, in which:—

Figure 1 is a top plan view of the device.

Fig. 2 is a sectional view on line 2—2 of Fig. 1.

Fig. 3 is a similar view on line 3—3 of Fig. 1.

Fig. 4 is a similar view on line 4—4 of Fig. 1.

Referring to the drawing, the numeral 1 designates a frame which consists of side bars 2 and end bars 3, said frame being adapted to be supported above the ditch or pit so that the end bars 3 thereof will rest upon the opposite sides of the ditch or pit.

The usual rails 4 extend longitudinally of the side bars 2 and are bolted thereto, said bars performing the same function as cross ties.

Extending transversely of the frame 1 is a shaft 5, the opposite ends of which rest upon the side bars 2 and are engaged under the rails 4, said shaft having its extreme outer ends formed with hooks 6, which engage the outer sides of the rails 4.

Pivotally connected to the shaft 5 is a platform 7, which has depending from its center a frame 8, said frame being suitably braced by truss rods 9 which have their ends connected to the ends of the platform 7, said frame serving to balance the platform so that the same will remain in a horizontal position.

Secured to the under surfaces of the side bars 2 and adjacent the ends thereof are bars 10, which serve to limit the rocking movement of the platform 7.

From this construction it will be seen that should an animal attempt to pass over the guard the platform will rock, thus scaring the animal so that it will back away and will make no further attempt to pass over the guard.

What is claimed is:—

In a cattle guard, the combination with spaced rails, of a frame including parallel side bars disposed longitudinally of and supporting said rails, a shaft extending transversely between the rails with its ends engaging said side bars, the ends of said shaft being extended beneath the rails and terminally bent to embrace the adjacent rail base, and a platform pivotally mounted on said shaft.

In testimony whereof, I affix my signature, in the presence of two witnesses.

HARLEN C. BATES.

Witnesses:
O. R. LASHLEY,
W. I. PLLUMMER.

Copies of this patent may be obtained for five cents each, by addressing the "Commissioner of Patents, Washington, D. C."